UNITED STATES PATENT OFFICE.

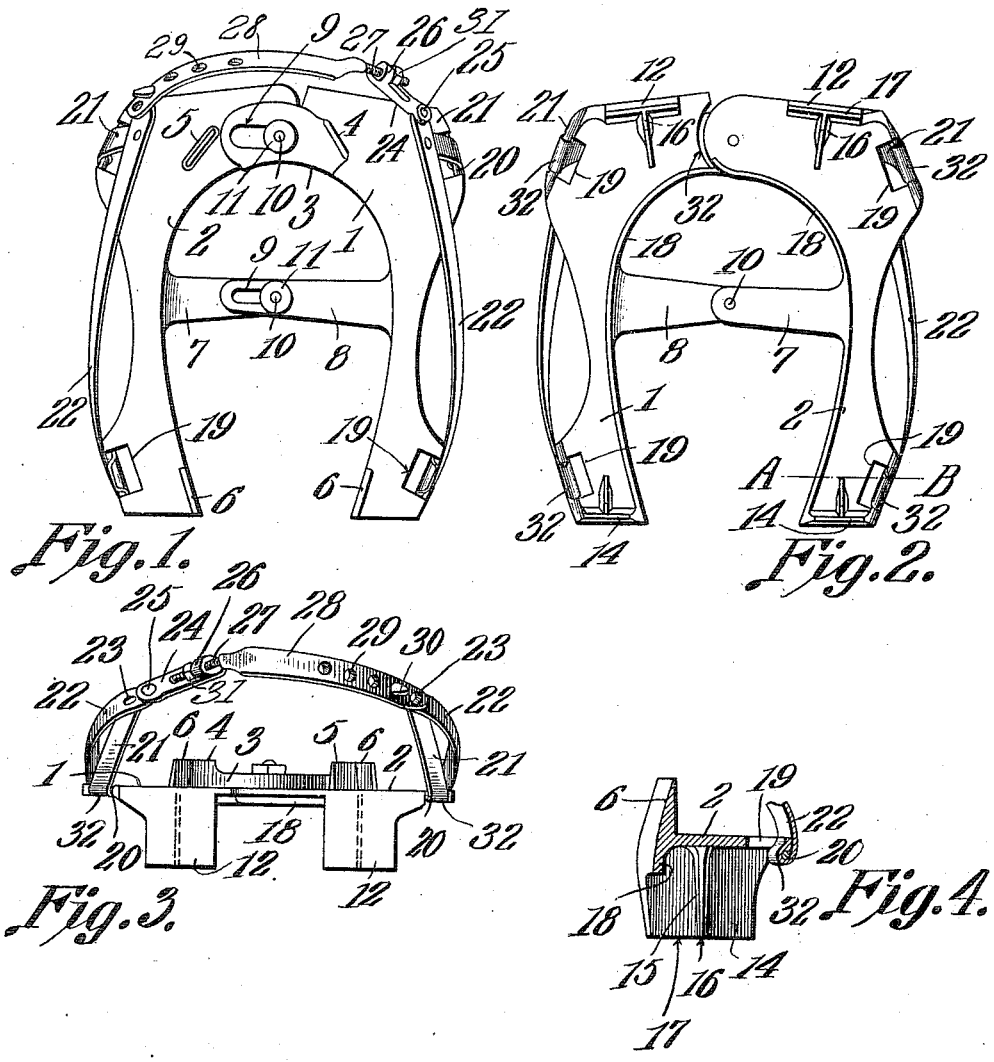

ANTHONY ROTH, JR., OF NEW BRUNSWICK, NEW JERSEY.

HORSESHOE.

986,220.  Specification of Letters Patent.  Patented Mar. 7, 1911.

Application filed October 29, 1910. Serial No. 589,776.

*To all whom it may concern:*

Be it known that I, ANTHONY ROTH, Jr., a citizen of the United States, residing at New Brunswick, in the county of Middlesex and State of New Jersey, have invented a new and useful Horseshoe, of which the following is a specification.

It is the object of this invention to provide a supplemental horse shoe which may be adjusted transversely, and secured in its adjusted positions, so as to fit hoofs of different widths.

Another object of the invention is to provide novel means for securing the supplemental horse shoe to the hoof.

Another object of the invention is to provide a series of gripping elements, of novel and improved form.

In the drawings,—Figure 1 is a top plan; Fig. 2 is a bottom plan; Fig. 3 is a front elevation; Fig. 4 is a transverse section upon the line A—B of Fig. 2; and Fig. 5 is a side elevation.

In the drawings, tread sections are denoted by the numerals 1 and 2. The tread section 1 is provided upon its upper surface, with an integrally formed rib 3, overlapping the toe portion of the tread section 2. At the outer end of this rib 3, an upstanding clip 4 is formed, coöperating with a similar upstanding clip 5, fashioned integrally with the tread section 2. These clips 4 and 5 coöperate with clips 6, formed adjacent the heels of the sections 1 and 2. The several clips, obviously, are adapted to engage the intrados of the horse shoe which is attached to the hoof, the device of the present invention, as its name indicates, being adapted to be employed as a supplemental means, applicable to a rigidly secured shoe, for the purpose of preventing slipping.

The tread section 2 is provided intermediate its toe and heel, with an integrally formed, inwardly projecting tongue 7, this tongue 7 overlapping a similar tongue 8, formed upon the tread section 1. In the rib 3 of the tread section 1, and within the tongue 8 of the said section, there are slots 9, elongated transversely of the shoe. In the toe portion of the tread section 2, and in the tongue 7 of the said tread section, there are bolts 10, adapted to register in the slots 9, these bolts 10 carrying washers 11, which, bearing upon the rib 3 and the tongue 8, constitute a means for holding the tread sections 1 and 2 together, it being obvious that the slots 9 will permit an adjustment of the sections 1 and 2, so that hoofs of different widths may be accommodated in a single structure. As clearly seen in Fig. 2, and there denoted by the numeral 32, the lower face of the tread section 1, beneath the rib 3, is recessed, forming a shoulder against which the extremity of the tread section 2 is adapted to abut.

The tread sections 1 and 2 are provided with depending toe calks 12, and with depending heel calks 14. These calks 12 and 14 are formed integrally with the tread sections, and flanges 15 are fashioned integrally with the calks and with the tread sections. The flanges 15 serve as reinforcing elements for the calks. The flanges 15 are blunted, at their lower ends, so as to provide the gripping edge 16, coöperating with the gripping edges 17 of the calks, and preventing the shoe from slipping. Each tread section 1 and 2 is provided with a depending flange 18, located along the intrados of the shoe. This flange 18 is of less width than the lengths of the calks 12 and 14. As the calks 12 and 14 wear down this flange 18, coming in contact with the ground, will serve as an additional anti-slipping element, coöperating with the calks 12 and 14.

The sections 1 and 2, adjacent the heel of the shoe and adjacent the toe thereof, are provided with openings 19, located relatively near to the outer periphery of the shoe. The outer extremities of these openings 19 are bridged by bars 20, preferably fashioned integrally with the sections 1 and 2.

The invention further includes securing straps, these straps comprising angularly disposed arms 21 and 22, the arms 21 and 22 being rigidly united as at 23. The arms 21 extend downwardly, adjacent the toe of the shoe, while the arms 22 extend rearwardly. These arms 21 and 22, at their lower extremities, are bent as at 32, to extend around the bars 20, whereby the straps are pivotally connected with the tread sections 1 and 2.

To the forward end of one of the arms 22 a link 24 is pivoted, as shown at 25. This link 24 is provided with an outstanding shoulder 26, through which extends the threaded end 27 of a tie 28, having openings 29 adapted to be received by a hook 30 formed upon the forward end of the other arm 22. Upon the threaded portion 27 of the tie there is a nut 31, which, when rotated into bearing with the shoulder 26, will serve to draw the straps closely about the hoof, and to hold the supplemental shoe in place.

In practical operation, the tread sections 1 and 2 are separated from each other, or slid toward a common central line, until the width of the shoe is properly determined. It is to be noted that the sections 1 and 2 may be tilted, with the bolt 10 which extends through the tongues 7 and 8 as a center, thus widening the toe of the shoe and decreasing the width of the heel of the shoe, or vice versa. Moreover, if desired, the tread sections 1 and 2 may remain pivotally connected at the toe of the shoe, permitting the heels of the shoe, only, to be swung apart. Or, if desired, both of the tread sections 1 and 2 to be separated bodily. When the proper configuration of the shoe has been determined by adjusting the said sections 1 and 2, the straps may be moved pivotally, to extend around the front of the hoof, the hook 30 being inserted into one of the openings 29, and the threaded end 27 of the tie 28 being extended through the shoulder 26. When the parts are thus positioned, the tread sections 1 and 2 may be clamped firmly upon the hoof, by rotating the clamping nut 31.

It will be noted that the anti-slipping features of the shoe are thoroughly provided for, the reinforcing flanges 15 coöperating with the calks 12 and 14, and the flange 18 which is located around the intrados of the shoe, obviously coöperating with the calks 12 and 14, so that the possibility of the supplemental shoe slipping, even upon a polished, or icy surface, is extremely remote.

Having thus described the invention, what is claimed is:—

A supplemental horse shoe comprising tread sections overlapped at the toe of the shoe and provided with overlapped, transverse tongues located between the heel and the toe of the shoe, the overlapped portion of one section and the tongue of said section being provided with elongated slots; and securing devices mounted in the other section and operating in the slots; there being upon the sections, in the vicinity of the toe of the shoe, outstanding clips, adapted to engage the intrados of the shoe with which the supplemental shoe is connected, the securing devices permitting a lateral adjustment of the tread sections, thereby rendering the clips operative under different transverse hoof dimensions.

In testimony that I claim the foregoing as my own, I have hereto affixed my signature in the presence of two witnesses.

ANTHONY ROTH, Jr.

Witnesses:
JABEZ H. HELM,
FLORENCE M. SMITH.

---

Copies of this patent may be obtained for five cents each, by addressing the "Commissioner of Patents, Washington, D. C."